R. Law,
Sawing Shingles.
N° 19,033.  Patented Jan. 5, 1858.
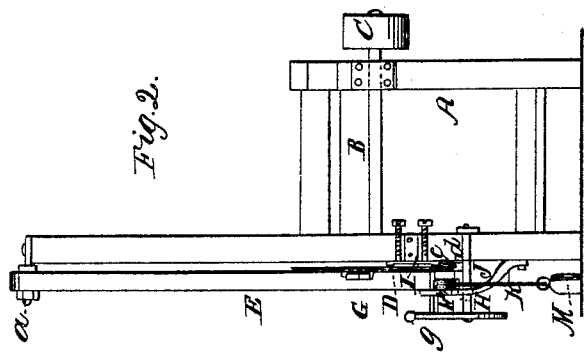
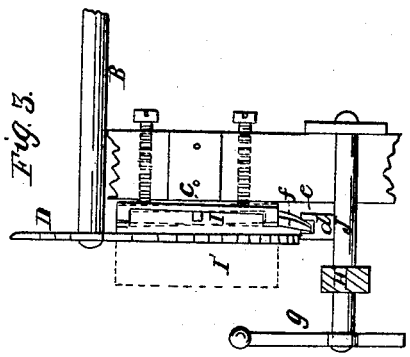
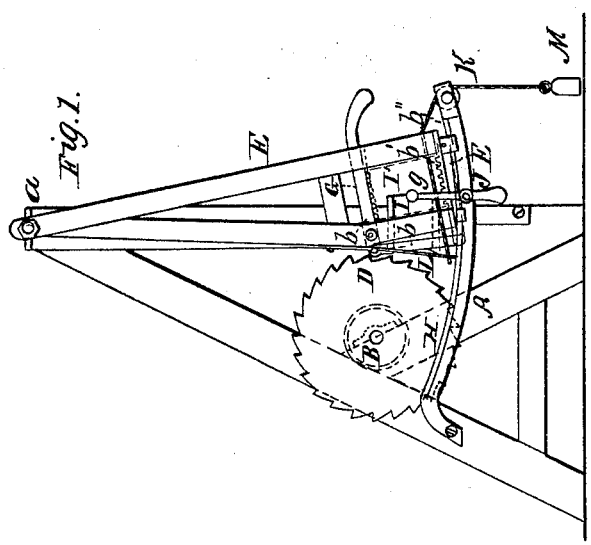

UNITED STATES PATENT OFFICE.

ROBT. LAW, OF PORTAGE CITY, WISCONSIN.

SHINGLE-MACHINE.

Specification of Letters Patent No. 19,033, dated January 5, 1858.

*To all whom it may concern:*

Be it known that I, ROBERT LAW, of Portage City, in the county of Columbia and State of Wisconsin, have invented a new and Improved Shingle-Machine; and I do hereby declare that the following is a full, clear, and exact description of the same, reference being had to the annexed drawings, making a part of this specification, in which—

Figure 1, is a side view of my improvement. Fig. 2, is a front end view of ditto. Fig. 3, is an enlarged detached view of the saw, and adjustable plate by which the desired taper is given the shingles.

Similar letters of reference indicate corresponding parts in the several figures.

This invention relates to an improvement in that class of shingle machines in which a circular saw is employed for cutting the shingles from the bolts.

The invention consists in the employment or use of a pendulous frame provided with a proper clamp to hold the "bolt," and arranged relatively with a circular saw and setting device for adjusting the "bolt" within the frame, the whole being so arranged that the shingles are cut from the bolt with great facility and adjusted so as to be cut in proper taper form.

To enable those skilled in the art to fully understand and construct my invention I will proceed to describe it.

A represents a framing in the upper part of which a shaft or arbor B is placed, said shaft being fitted in proper bearings and having a driving pulley C at one end, and a circular saw D at the opposite end.

The saw D is at one side of the framing A, and this side adjoining the saw is extended upward much above the opposite side and has a frame E, suspended to a pivot (*a*) at its upper end. The frame E may be formed of two bars connected together in V-form the upper end forming the point or being the point of junction of the two bars, the lower ends being sufficiently distended to allow the "bolt" to be placed between them. The lower ends of the bars of the frame E, are connected by a metal plate F, the upper surface of which is corrugated transversely.

A lever G is connected at one side of the frame E to a bar (*b*) which is attached at its lower end to a corrugated bar (*b'*) having a serrated surface and pivoted to the frame as shown at (*b''*); the lower edge of this lever G is serrated and by being raised and lowered to a certain degree the bar (*b*) will be moved simultaneously in an opposite direction.

H, is a curved bar which is attached to one side of the framing A, directly below the frame E and the bottom of plate F has two grooved projections attached which fit on or over the upper edge of the bar H which serves as a guide, said bar being so curved as to form a part of a circle of which the pivot (*a*) is the center. This will be clearly understood by referring to Fig. 1.

The frame E is allowed to swing or work quite near the side of the saw D, but does not come in contact with it.

To the side of the framing A where the saw D and frame E work there is attached a plate I. This plate is pivoted to the framing at its center as shown at (*c*) so that it may be moved and its face or outer side be placed in planes having oblique positions relatively with the saw and reverse to each other, as shown in black and red, Fig. 3. This plate is moved or adjusted by a shaft J, having an arm (*d*) attached and forked at the end obliquely as shown at (*e*), said fork encompassing an oblique projection (*f*) attached to the lower end of the plate I. To the outer end of the shaft J, a lever (*g*) is attached.

K is a cord or strap which passes loosely through holes in the bars of the frame E, one end of this cord or strap is attached to a spring L which is attached to the frame and the opposite end of the cord or strap has a weight M attached.

The operation is as follows: The bolt shown in red and designated by I' is placed endwise on the plate F, and its inner or face side is pressed against the outer side of the plate I, by means of the cord or strap K having the weight M attached. The lever G is then depressed and held down upon the upper end of the bolt by the hand and the frame E is then shoved forward by hand and the saw D will cut a shingle from the bolt. When the frame E is drawn back the plate I has its position reversed by turning the shaft J, the lever G is raised and the bar (*b'*) consequently lowered to liberate the bolt which is again pressed against the outer or face side of plate I, by the loaded cord K. The lever G is then depressed the bar (*b'*) at the same time rising to secure the bolt in proper position and the frame E is again shoved forward and a succeeding shingle is cut. The plate I, it will be seen causes the shingles to be cut in taper form, and as its position is reversed at each stroke of the frame E and the bolt pressed against it at the commencement of each stroke, the "bolt" will be so presented to the saw that the butts and opposite or thin ends of the shingles will each be cut alternately from the top and bottom of the "bolt." The spring L serves to conteract in a manner the weight M and prevent an unequal pressure of the cord or strap K on the bolt. This spring in connection with the transverse corrugation on the plate F, prevents the bolt from being turned obliquely to the plate L, or, in other words, insure a parallel movement of the "bolt," toward said plate. In consequence of having the saw D cut with the grain of the wood the shingles are not strictly speaking sawed from the bolt, they are partially split, the fibers being parted in a measure rather than cut, consequently shingles cut by this machine are not attended with the disadvantages of the ordinary sawed shingles, for their fibers not being cut transversely, they are not liable to "spring" or warp, they closely resemble the rived shingles or those split by knives, but have not the disadvantage of their irregular form.

Having thus described my invention what I claim as new and desire to secure by Letters Patent, is,

1. The combination of the pendulous frame E, which receive the bolt I', and the saw D, arranged substantially as and for the purpose set forth.

2. The peculiar means employed for securing and adjusting the bolt I', in the pendulous frame E, viz. the adjustable plate I, loaded cord K, connected with spring L, the corrugated bottom plate F, and lever G connected with bar (b'), arranged substantially as shown and described.

ROBT. LAW.

Witnesses:
JOHN A. BROWN,
J. M. DOTY.